Oct. 20, 1936.　　C. M. BOLSER　　2,057,932
OIL FILTER
Filed Dec. 4, 1934
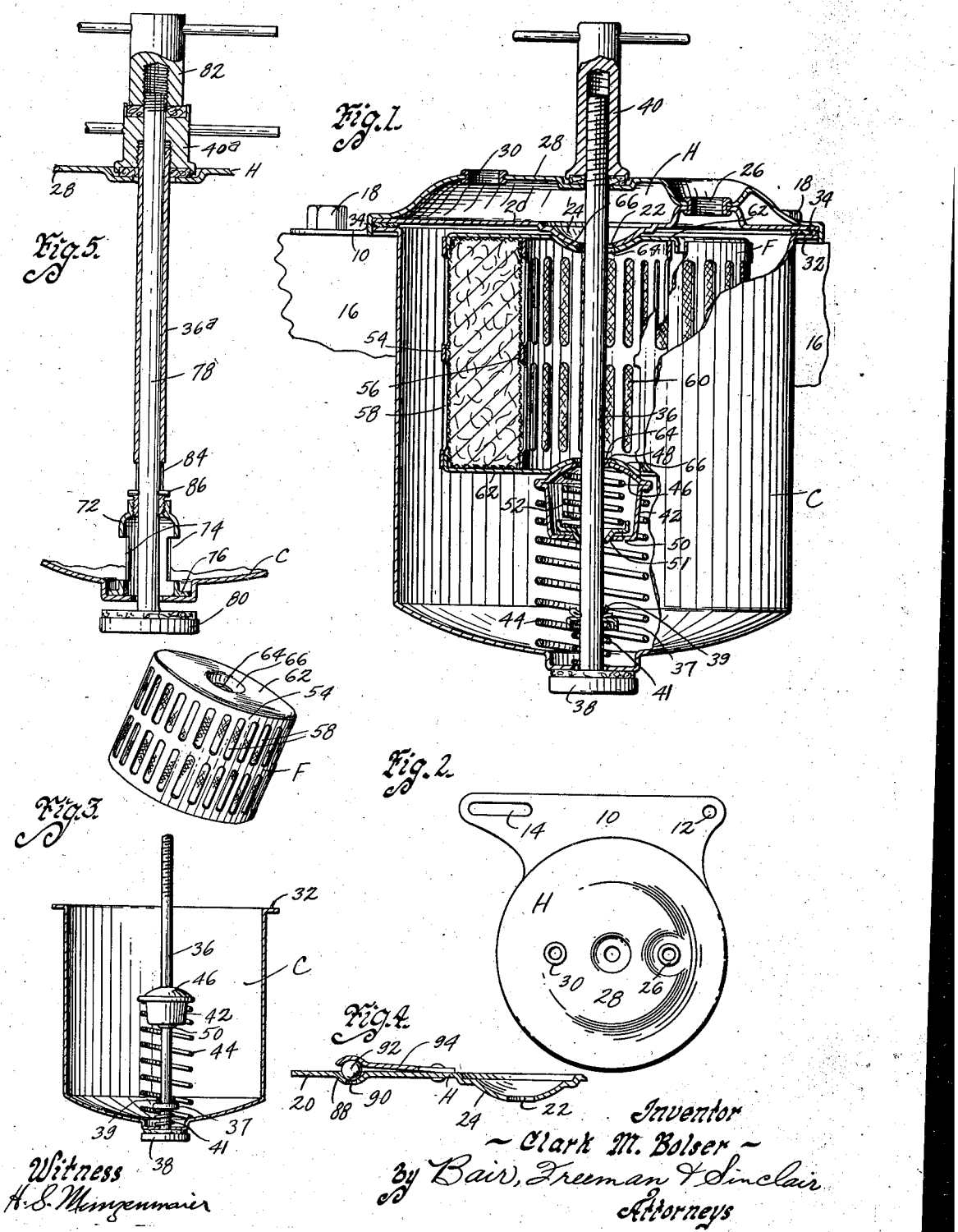
Inventor
~ Clark M. Bolser ~
By Bair, Freeman & Sinclair
Attorneys
Witness
H. S. Minzenmaier Patented Oct. 20, 1936

2,057,932

UNITED STATES PATENT OFFICE 2,057,932

OIL FILTER

Clark M. Bolser, Des Moines, Iowa, assignor to The Bolser Corporation, Des Moines, Iowa, a corporation of Iowa Application December 4, 1934, Serial No. 755,902

3 Claims. (Cl. 210—166)

An object of my invention is to provide an oil filter for automobile engines and the like of such simple, durable and inexpensive construction that the filter insert therein can be discarded each time the oil is changed, so that when the driver starts with new oil, he also starts with a clean filter.

A further object is to provide an oil filter so constructed that it is easily opened and the filter insert readily discarded, a new filter insert being readily insertable, all of which can be done in a minimum of time, for instance while the service station attendant is draining the oil from the crank case of an automobile.

More particularly, it is my object to provide an oil filter comprising an openable container normally held together with a tie rod, an oil filter insert being threadable on the tie rod and provided with seats coacting with seats of the container in such manner that by the single manipulation of closing the container by means of the tie rod, the filter insert is aligned and sealed so that all of the oil thereafter flowing through the container will flow through the filter insert.

Still a further object is to provide an inexpensive filter insert made of tin or similar material, having spaced inner and outer walls and a pair of heads with filter material inserted between the inner and outer walls, such a unit being so inexpensive that the service stations can afford to furnish them free with each oil change, thus creating a demand among the autoists for oil changes at the stations furnishing such service.

With these and other objects in view, my invention consists in the construction, arrangement and combination of the various parts of my oil filter, whereby the objects contemplated are attained, as hereinafter more fully set forth, pointed out in my claims, and illustrated in the accompanying drawing, in which:

Figure 1 is a side elevation, partly in section of an oil filter embodying my invention.

Figure 2 is a plan view of the head member used to cover the oil container of my oil filter.

Figure 3 is a separated view of the oil container and filter insert, the oil container being shown in section and the filter insert in perspective to illustrate how the filter insert can be removed from the oil container, and a new filter insert placed therein.

Figure 4 is a slight modification of a check valve or by-pass valve, which can be substituted for another form shown in Figure 1; and Figure 5 is a slight modification of the combined tie rod means for holding the container and draining a portion of the oil and sediment therefrom, before opening the same.

On the accompanying drawing, I have used the reference character H to indicate a head element, C a container element, and F a filter insert. The head H has a flange 10 provided with perforations 12 and 14, whereby the head member H may be mounted on an engine head or the like 16 by means of the ordinary engine head bolts 18 used to retain the engine head on the engine block. I have found this the most satisfactory and universal type of mounting for my oil filter.

The head H has within it what might be termed a partition 20. This is perforated at its center as indicated at 22 and is provided with an embossed seat 24. A threaded thimble 26 has its ends spun over the edges of the perforations in an upper wall 28 of the head H and the partition 20, as shown in Figure 1, so as to form an inlet opening through the head H.

A similar thimble 30 is associated with the upper wall 28, so as to form an outlet opening communicating with the space between the partition 20 and the wall 28.

The thimbles 26 and 30 are designed for receiving ordinary copper tubing fittings, as usually provided in the oil lines of an automobile or similar engine.

If there is an oil filter already provided on the automobile, the fittings are merely removed from that filter and associated with mine, while if no oil filter is provided, the copper tube from the oil pump to the engine can be cut and the proper fittings inserted therein and associated with the thimbles 26 and 30, so that the oil will flow through the filter before entering the engine bearings.

The container C is tubular in character, having an upper, annular flange 32 to coact with a gasket 34 positioned against the partition 20.

For holding the container C against the head H and sealing the two by the gasket 34, I provide a tie rod 36 having a head 38 and a nut 40. The head 38 and the nut 40 are suitably sealed with gaskets relative to the container C and head H.

A cup washer 37 is retained by a cotter pin 39 on the tie rod 36. A spring 41 is interposed between the bottom of the container C and the cup washer 37 to urge the head 38 into engagement with the lower end of the container C.

Within the container C, a seat element 42 is slidably mounted on the tie rod 36. It is normally urged in an upward direction by a spring 44. The upper end thereof has a hemispherical seat 46 and a perforation 48.

Within the seat element 42 is a disc-like check valve 50, normally retained seated against the edge of a perforation 51 by a spring 52.

The perforations 22 and 48, it will be noted, are somewhat larger in diameter than the tie rod 36, for a purpose which will hereinafter appear.

The filter insert F comprises spaced outer and inner walls 54 and 56 respectively. These are perforated as indicated at 58 and 60 and the spaces between the walls and also the space within the inner wall are entirely closed by head members 62. The head members are perforated as indicated at 64 and embossed as indicated at 66. The perforations 64 also are larger in diameter than the tie rod 36 and the embossments 66 are hemispherical, the same as the seats 24 and 46 of the partition 20 and the seat insert 42.

Between the walls 54 and 56 of the filter element F, filtering material 68 is inserted. It is preferably of cotton of wool-like fibrous material and enclosed in a fabric enclosure 70 to prevent it from being extruded through the perforations 60.

In Figure 5, I have shown a modification wherein a tie rod 36a is provided, which is of tubular formation. The lower end thereof is secured to a thimble-like element 72 having perforations 74. The lower end thereof is flanged as at 76, and this flange is secured to the bottom of the container C. A nut 40a is provided for the tubular tie rod 36a while within the bore of the tie rod 36a a drain valve rod 78 is mounted. It is provided with a head 80 and a nut 82, while a gasket is interposed between the head 80 and the bottom of the container C. The tie rod 36a is slotted as indicated at 84 and a limiting pin 86 extends through the slot and through the drain valve rod 78.

*Practical operation*

In the operation of my oil filter, oil flows into the container C through the thimble 26, then through the filtering material 68 to the interior of the filter insert F. From the interior, it flows through the enlarged opening 64 in the upper head 62 of the filter insert, and then through the perforations 22 of the partition 20. Thereafter the oil flows out through the thimble 30. Thus all the oil passing into the container must pass through filtering material before it flows out of the container.

If the filter becomes unduly clogged with dirt or the like, the oil pressure will be built up, whereupon it will open the check valve 50 against the pressure of the spring 52 and permit the oil from the container to flow into the seat element 42 and then through the perforation 48 and the perforation 64 of the lower head 62 of the filter insert, thus entering the interior of the filter insert without passing through the filtering material. This provides a safety feature, so that the flow of oil will not be stopped by a clogged filter.

Instead of the safety valve arrangement shown in Figure 1, I may provide a seat 88 in the partition 20, as shown in Figure 4, having a perforation 90 against which a ball 92 is normally held seated by a spring 94.

When the oil can flow freely through the filter, it will not unseat the ball 92 from the seat 88, but will be properly filtered, while when the filter is clogged, the ball will be unseated due to the excess pressure built up by the oil pump, so that the engine can be furnished with oil even though the filter is clogged.

When it is time to change the oil in the crank case of the automobile, while the oil is being drained from the crank case, the service station attendant can loosen the nut 40, while holding the container C in position, and then press downwardly on the nut, still holding the container so that the head 38 of the tie rod 36 will be spaced from the lower end of the container against the action of the spring 40, and thus drain out a small quantity of the oil and sediment into a suitable container, so as to relieve the oil pressure within the filter and lower the oil level therein to such a point that it will not be spilled when the container is subsequently removed for emptying its contents and discharging the used filter insert F therefrom.

After the desired amount of oil has been drained out, the nut 40 can be removed, whereupon the container can be lowered and carried to a suitable receptacle into which its contents and the filter unit can be discharged. The filter insert is merely surrounding the tie rod 36, so that when the container is turned upsidedown, the filter insert will readily drop out.

The upper end of the spring 44 preferably frictionally grips the seat element 42, so that it will not be discharged at the same time.

The attendant then threads a new filter insert on the tie rod 36 and replaces the container by simply threading the tie rod up through the perforations of the partition 20, and the top wall 28 of the head element H.

The nut 40 can then be replaced and tightened whereupon the gaskets 34 and those adjacent the head 38 of the tie rod and adjacent the nut 40 will be sealed in position.

The hemispherical seats 46, 66 and 24 will all automatically and properly seat, due to their shape, and will be held seated by the constraint of the spring 44, so that the mere operation of applying and tightening the nut 40 assembles the filter, and the new filter insert in a very simple manner.

To avoid the necessity of having to hold the container C up, while loosening the nut 40, and while pushing this nut down to drain the container, the form of construction shown in Figure 5 can be used. With this arrangement the container C can be drained, by removing the nut 82, whereupon the head 80 of the rod 78 will disengage the lower end of the container C and be limited by the cotter pin 86 striking the lower ends of the slots 84. After draining, the nut 40a can be taken off, so that the container and the filter insert can be removed.

From the foregoing description, it will be obvious that I have provided a filter, having an inexpensive filter insert, which is readily removable and renewable and which therefore can be renewed by the service station attendant free of charge as a part of his service, as the profits on the oil for the oil change are sufficient to take care of this additional service in consideration for the autoist returning to that station for his next oil change, which, of course, he will do because of the filter change service rendered.

The oil filter itself is inexpensive, so that the autoist can afford to buy one of these filters to replace the one he already has, if he has one.

One of the main troubles with oil filters as now used on automobile engines is that they are designed for change after some 7,000 or 8,000 miles driving, and each time the oil is changed, the new oil must be pumped through the dirty filtering material and actually picks up dirt from it and circulates this dirt through the bearings, whereas with a new filter insert, each time the oil is changed, the filter need take out only the dirt accumulated in that quantity of oil, and has no dirt in it to get into the new oil as it circulates.

This also effects a saving in oil, as oil changes need not be made so often, and by actual experience I have found that where an oil change is necessary each 500 miles with a filter, after the automobile has been driven 5000 or 6000 miles, oil changes need be made only each 1000 miles when a new filter unit is installed at each oil change. Obviously this reduces the quantity of oil consumed and also reduces wear on the engine, as the oil is kept cleaner for a longer period after it has been changed.

Some changes may be made in the construction and arrangement of the various parts of my oil filter, without departing from the real spirit and purpose of my invention, and it is my intention to cover by my claims, any modified forms of structure or use of mechanical equivalents, which may be reasonably included within their scope.

I claim as my invention:

1. In an oil filter, an openable container, tie rod means for normally retaining the same closed, said container having a perforate seat, a filter insert having a perforate seat for coaction and alignment therewith and a second perforate seat, a member movable on said tie rod and having a perforate seat for coaction and alignment with said second seat, means for introducing oil to and receiving filtered oil from said container, such oil passing through at least one pair of said coacting seats and check valve means for permitting the oil to by-pass said filter insert and flow through the other pair of coacting seats upon the pressure of the oil being greater than that for which the check valve is set, said tie rod having a head, said container having at its lower end an opening normally sealed by said head, said head being disengageable from said lower end to unseal said opening by pressing downwardly upon the upper end of the tie rod to drain a portion of the contents from said container before opening the same.

2. In an oil filter, an openable container, tie rod means for normally retaining the same closed, said container having a perforate seat, a filter insert having a perforate seat for coaction and alignment therewith and a second perforate seat, a member movable on said tie rod and having a perforate seat for coaction and alignment with said second seat, means for introducing oil to and receiving filtered oil from said container, such oil passing through at least one pair of said coacting seats and check valve means for permitting the oil to by-pass said filter insert and flow through the other pair of coacting seats upon the pressure of the oil being greater than that for which the check valve is set, said tie rod having a head, said container having at its lower end an opening normally sealed by said head, said head being disengageable from said lower end to unseal said opening by pressing downwardly upon the upper end of the tie rod to drain a portion of the contents from said container before opening the same and a spring normally retaining said head engaged with said opening.

3. A filter device of the class described comprising a supporting head, said head including a pair of spaced sheet metal plates, a pair of oil connections with said head, one extending through the outer plate to the space between the plates, and the other extending through both plates to the space below the plates, a container suspended from said supporting head, said lower plate having in its under surface a seat provided with an opening therein, a spring pressed member within said container normally tending to move toward said seat, said last member having a seat similar in shape to said first seat, a filtration device in the form of a complete unit yieldingly held within said container between said seats, said filtration device having an opening registering with the opening of said lower plate to permit passage of liquid from said filtration device to said space between said plates, similar coacting seats on the top and bottom of said filtration device to coact with the first two mentioned seats and means for securing said container in suspended position from said supporting head.

CLARK M. BOLSER.